United States Patent
Baker et al.

(10) Patent No.: US 9,460,638 B2
(45) Date of Patent: Oct. 4, 2016

(54) SMART INJECTION TRAINING DEVICE AND SYSTEM

(71) Applicants: Jeff Baker, Orlando, FL (US); Paul van der Pol, Winter Garden, FL (US); Christopher Chung, Orlando, FL (US); Francis Michael Siemer, Orlando, FL (US)

(72) Inventors: Jeff Baker, Orlando, FL (US); Paul van der Pol, Winter Garden, FL (US); Christopher Chung, Orlando, FL (US); Francis Michael Siemer, Orlando, FL (US)

( * ) Notice: Subject to any disclaimer, the term of this patent is extended or adjusted under 35 U.S.C. 154(b) by 108 days.

(21) Appl. No.: 14/320,455

(22) Filed: Jun. 30, 2014

(65) Prior Publication Data

US 2015/0379899 A1    Dec. 31, 2015

(51) Int. Cl.
*G09B 23/28*    (2006.01)

(52) U.S. Cl.
CPC .................... *G09B 23/285* (2013.01)

(58) Field of Classification Search
CPC .............................. G09B 23/285; G09B 23/30
USPC .................................................. 434/272, 267
See application file for complete search history.

(56) References Cited

U.S. PATENT DOCUMENTS

| | | | |
|---|---|---|---|
| 2,871,584 A | 2/1959 | Poole | |
| 3,339,290 A | 9/1967 | Doyle | |
| 6,272,936 B1 | 8/2001 | Oreper et al. | |
| 6,575,757 B1 | 6/2003 | Leight et al. | |
| 7,988,451 B2 | 8/2011 | Battaglia, Jr. | |
| 8,342,853 B2 | 1/2013 | Cohen | |
| 8,633,916 B2 | 1/2014 | Bernstein et al. | |
| 8,684,744 B2 | 4/2014 | Selz et al. | |
| 2005/0222539 A1* | 10/2005 | Gonzales | A61M 5/2033 604/207 |
| 2008/0059133 A1* | 3/2008 | Edwards | G09B 23/285 703/7 |
| 2009/0035737 A1* | 2/2009 | Battaglia, Jr. | G09B 23/285 434/219 |
| 2009/0128330 A1* | 5/2009 | Monroe | A61B 19/026 340/568.1 |
| 2010/0273135 A1* | 10/2010 | Cohen | G09B 23/32 434/267 |
| 2011/0236866 A1* | 9/2011 | Psaltis | G09B 23/285 434/263 |
| 2011/0275939 A1 | 11/2011 | Walsh et al. | |

FOREIGN PATENT DOCUMENTS

| | | |
|---|---|---|
| EP | 2541532 A1 | 1/2013 |
| WO | 2007126854 A2 | 11/2007 |
| WO | 2009086452 A1 | 7/2009 |
| WO | 2011071837 A2 | 6/2011 |
| WO | 2011098129 A1 | 8/2011 |

* cited by examiner

*Primary Examiner* — Xuan Thai
*Assistant Examiner* — Kristen Shirley
(74) *Attorney, Agent, or Firm* — Timothy H. Van Dyke; Beusse, Wolter, Sanks & Maire, PLLC

(57) ABSTRACT

In an embodiment, an injection training device configured to interact with an injection device having an injection member is provided herein. The injection training device includes a housing having an opening, a pad component disposed in the opening, wherein the pad component is configured to receive an injection member of an injection device. The injection training device further includes a signal output component and circuitry associated with the housing to receive information about the operation of the injection device and to provide a communication about an operation of the injection device to a user of the injection training device through the signal output component.

27 Claims, 8 Drawing Sheets

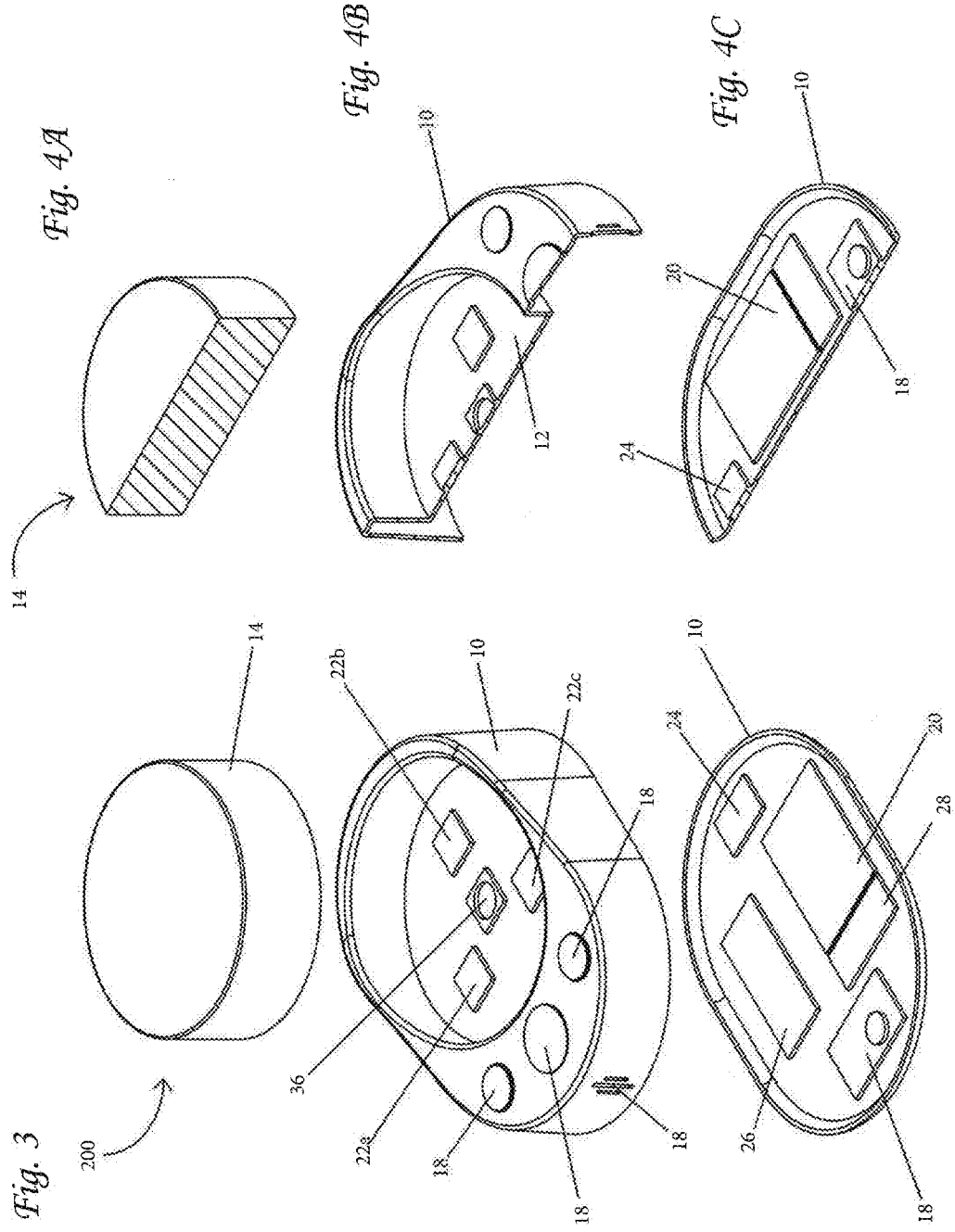

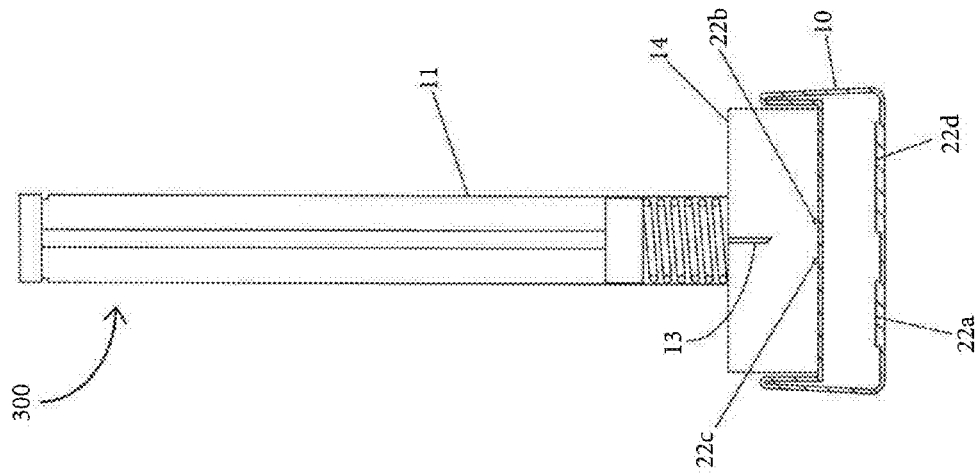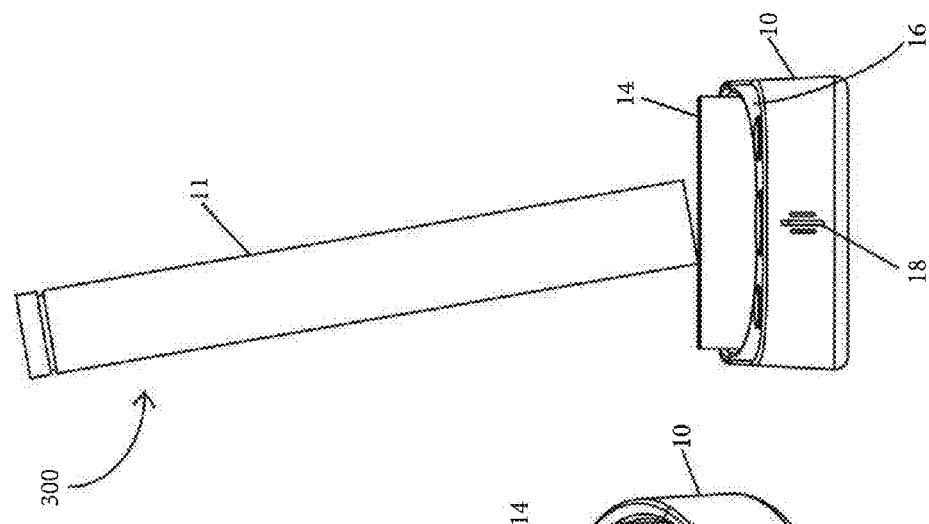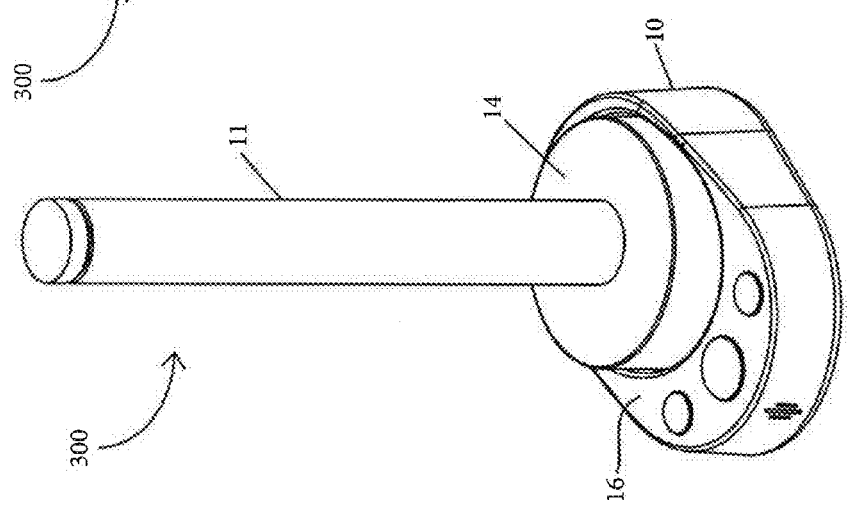

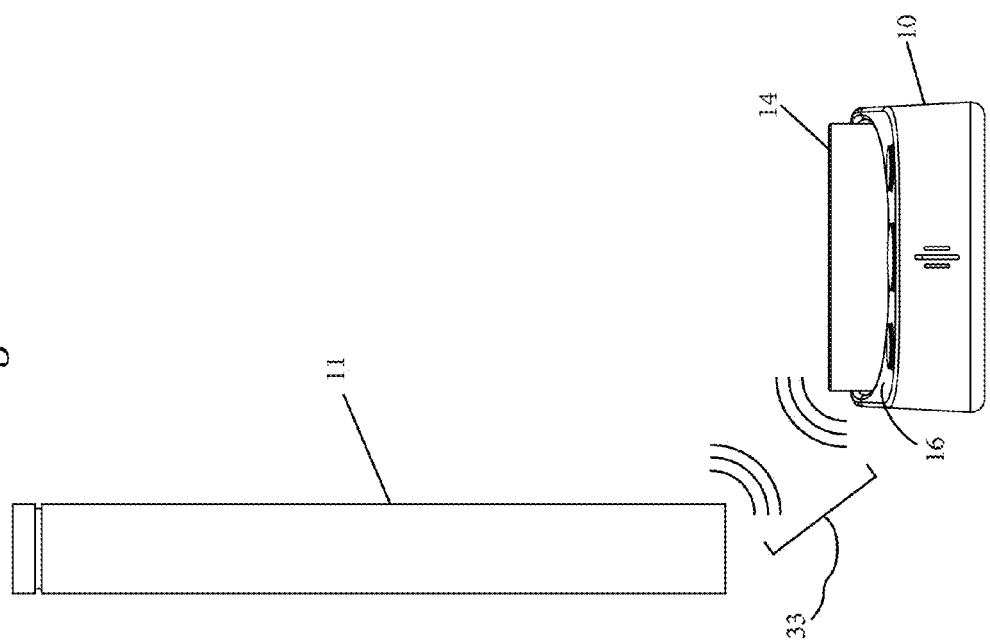

SMART INJECTION TRAINING DEVICE AND SYSTEM

FIELD OF INVENTION

Exemplary embodiments of the present disclosure relate to injection training devices for interfacing with an injection device, wherein a user can be trained to use the injection device with the assistance of the injection training device, in some embodiments. Embodiments disclosed herein may include injection training devices or systems having associated circuitry configurable or programmable to guide a user through the training for using the injection device while providing a simulated injection experience for the user by providing materials which simulate the components of the human or non-human animal body such as skin tissue, fat tissue, among other components of the body to accurately simulate the actual medicament drug delivery experience via injection.

BACKGROUND

Performing a medical treatment or test on oneself carries with it certain risks and often creates a level of anxiety for the user performing the treatment or test. It has proven beneficial in the medical field to practice various medical techniques including drug delivery, specifically where it relates to injections and other invasive drug delivery means prior to delivering the medications to a patient in need, and particularly in the case of self-administration of medicaments. Training devices are helpful in reducing errors and anxiety associated with self administering medical treatment, as well as increasing efficiency and accuracy in providing the treatment to patients. Medical devices can be intimidating to use; the fear associated with giving oneself an injection, for example, can be traumatic. This fear is increased in persons with little or no experience in self-administration of medications. Consequently, devices and methods to assist in training individuals to inject themselves or otherwise self-administer medication are beneficial in decreasing or preventing the anxiety associated with medicament delivery. Medicament delivery training devices allow patients to practice giving themselves a full dose in a safe and effective manner.

SUMMARY

In an embodiment, an injection training device configured to interact with an injection device having an injection member is provided herein. The injection training device includes a housing having an opening, a pad component disposed in the opening, wherein the pad component is configured to receive an injection member of an injection device. The injection training device further includes a signal output component and circuitry associated with the housing to receive information about the operation of the injection device and to provide a communication about an operation of the injection device to a user of the injection training device through the signal output component.

In another embodiment, an injection training system configured to provide instructions for using an injection device to a user in a sequence of steps is provided. The injection training system includes a housing, the housing including an opening. The system includes a pad component disposed within the opening, and an injection device having an injection member, the injection device communicatingly connects to the housing, and pad component is configured to receive the injection member. The system further includes a user interface, a signal output component, and circuitry associated with the housing. The circuitry is configured to control provision of the instructions to the user in the sequence of steps, wherein the injection training system is configured to provide a communication about an operation of the injection device to the user through the signal output component, in an embodiment.

In still a further embodiment, an injection training device configured to interact with an injection device having an injection member, the injection training device configured to provide instructions for using the injection device to a user in a sequence of steps and including a housing having an opening is provided herein. The injection training device further includes a pad component disposed within the opening, the pad component configured to receive an injection member of an injection device, a user interface, a signal output component configured to provide communication from the injection training device to the user, one or more sensors, wherein at least one of the one or more sensors is associated with the pad component and at least one of the one or more sensors is configured to sense a presence of the injection member, and circuitry is associated with the housing. The circuitry may include a timekeeping component to record one or more time values, wherein said circuitry is configured to provide a communication about an operation of the injection device to a user based on the presence of the injection member sensed and a time value recorded by the timekeeping component.

BRIEF DESCRIPTION OF THE DRAWINGS

FIG. 3 provides an exploded view of another embodiment of an injection training device.

FIGS. 4A-C provide sectional views of the components of the injection training device embodiment of FIG. 3.

FIG. 5A provides a perspective view of an injection training system embodiment wherein an injection device is situated perpendicular to a pad component.

FIG. 5B provides a perspective view of the injection training system embodiment of FIG. 5A, wherein the injection device is tilted at an angle relative to the pad component.

FIG. 5C provides a cross-sectional view of the injection training system embodiment as shown in FIG. 5A.

FIG. 6 provides a perspective view of the injection training system, wherein a housing is communicatingly connected to the injection device by wireless connection.

DETAILED DESCRIPTION

Figure 1:
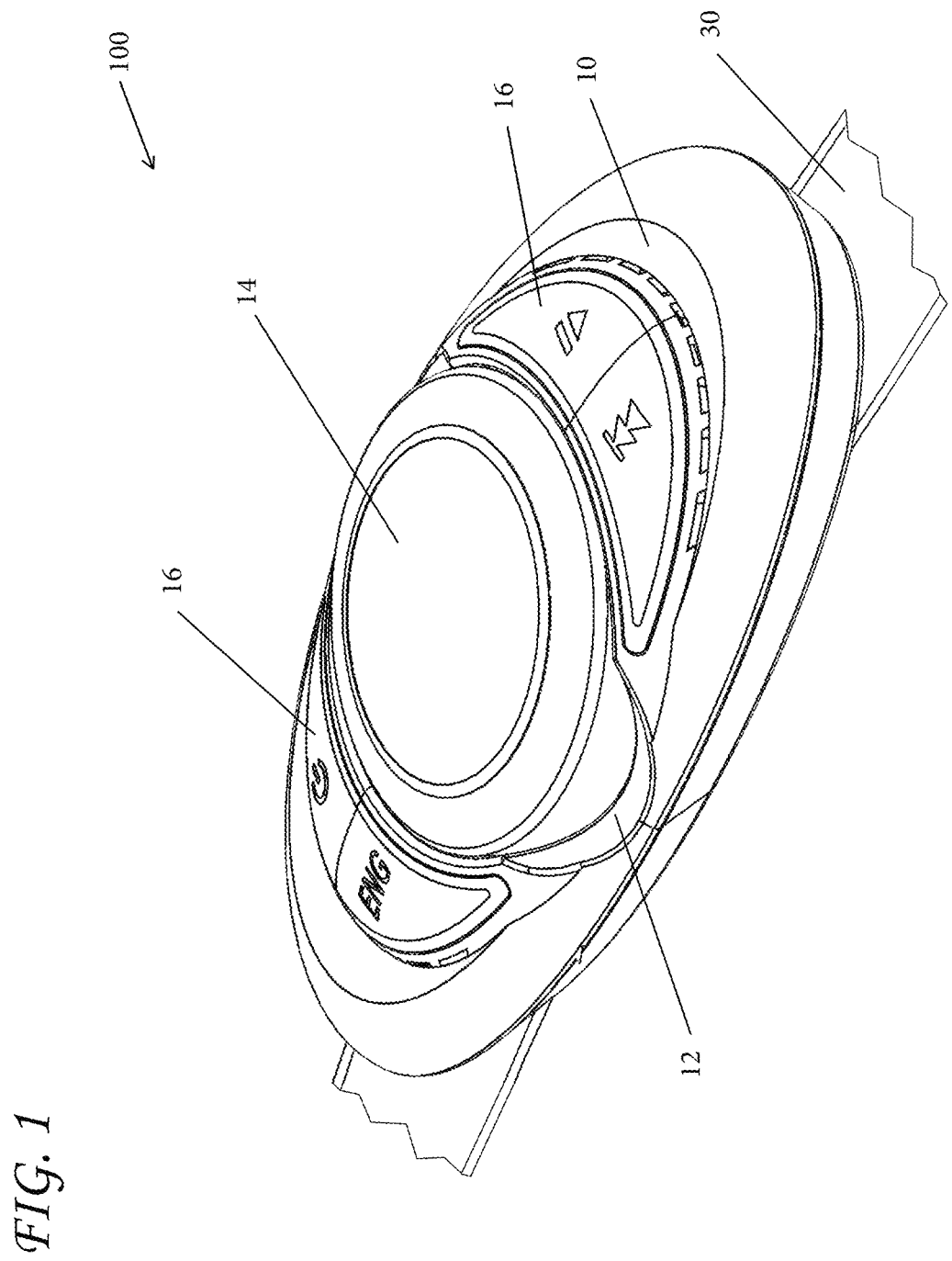
FIG. 1 provides a perspective view of an embodiment of an injection training device.

The inventors have discovered herein, an injection training device and injection training system which can be used to train or teach a user to properly administer an injection using an injection device. This device and system can be used with both a medicament delivery device, such as an auto-injector, for example, or with an injection simulation or training device in non-limiting embodiments.

In addition to increasing confidence in self-administration in users by practicing with an injection training device and/or system, the inventors have identified additional benefits associated with multi-sensory learning regarding an injection training device and/or system. It has been discovered that multi-sensory learning establishes multiple pathways in separate areas in the brain and ultimately results in a highly effective learning experience. In order to gain benefits from multi-sensory learning devices, certain requirements must be met including but not limited to the following: the sources of stimuli must be in close proximity to one another; the sources of stimuli must be synchronous; the stimuli must be congruous semantically, otherwise the superior colliculus (area of the brain located in the midbrain known for integrating multiple sources of information) will segregate the stimuli instead of integrate them; and finally, the use of extraneous materials must be limited. With knowledge of the essential factors in multi-sensory learning and incorporation of the multi-sensory learning features into a training system, the inventors have developed a novel, cutting-edge injection training device and system.

Exemplary embodiments of the injection training device can be implemented to educate users on the proper operation and use of an injection device. The injection training device and/or system can be used to make prospective and current users of medicament devices feel more comfortable and confident in self-administration (or administration to others) of medicaments, and can help users understand the proper steps of medicament delivery. Exemplary embodiments of the injection training device and/or system can be used by a user before the user administers a medication by way of, for example, an auto-injector by using the injection training device and/or system with either an auto injector or an auto-injector trainer, for example, which simulates an actual injection with or without guidance from the injection training device and/or system.

The injection training device and/or system takes advantage of the multisensory learning capabilities of the human brain. As such, the injection training device and/or system provides the means to stimulate primarily the visual, auditory and somatic systems of the human nervous system. In providing a simulated experience, the injection training device and/or system herein may be provided, in an embodiment, wherein at least a portion of the injection training device and/or system, the pad component, for example, is provided with a skin layer and/or a subcutaneous layer. In a non-limiting embodiment, the skin and subcutaneous layers of the pad component are configured to mimic human or non-human animal skin and subcutaneous tissue in appearance, texture, feel, among other properties. The portions of the device/system that mimic human or non-human animal components include accurate skin puncture resistance, for example, to provide an accurate simulated experience similar to an actual injection of the human or non-human animal. For example, the skin layer of the embodiments of the pad component described herein have a similar skin puncture resistance as human or non-human animal skin such that it mimics the movement and the look and feel of human or non-human animal skin when it is pierced with an injection member. The deflection of the pad component accurately represents real tissue when the needle shield is pressed into the pad component, for example. The pad component, therefore, accurately simulates the pinching of the skin in a non-limiting embodiment. The injection training device and/or system may include an adipose layer, simulated ligament material, simulated tendon material, simulated bone material, simulated vasculature material, simulated organ material, and/or simulated bodily fluid, wherein the layers, material and fluid are configured to mimic human or non-human animal skin and adipose tissue, ligaments, tendons, bones, vasculature, organs and/or fluid.

Therefore, in a further embodiment, the pad component or a portion thereof may simulate human or non-human animal bone, organ, muscle, nerve, ligament, tendon or arterial tissue, in non-limiting examples. In yet a further embodiment, the injection training device and/or system may be used to train users for injections into a human or non-human animal body wherein these other tissues are located. For example, the injection training device and/or system may provide a user training for an intrathecal injection for chemotherapy, spinal canal injection and/or pain management applications, for example, and therefore the pad component may include materials and/or fluids configured to mimic the look and feel of the human or non-human animal spine and spinal fluid (i.e., cerebral spinal fluid) and surrounding tissues in a non-limiting embodiment. In another example, the injection training device and/or system may be used to train a user to perform joint aspirations, and therefore may include materials to mimic the look and feel of a human or non-human joint, for example, a knee joint including the bone, ligaments, nerves, vessels, tendons, skin and/or fluid therein. Other uses and applications for the injection training device and/or system for training users for using various medical devices during different medical procedures or administration of medicaments and/or training for such administration are contemplated herein.

Embodiments of the injection training device and/or system herein allow for the practice of subcutaneous injections, in non-limiting embodiments, by healthcare providers and/or patients. The injection training device and system described herein can be used with many different types of injection devices and training devices, including but not limited to single dose pre-filled syringes, single dose auto-injectors, multi-dose auto injectors, among other types of injection devices, as well as injection device trainers.

The term "injection device" as used herein includes but is not limited to injection devices which are configured to deliver medicament to a patient, injection devices configured to simulate a drug delivery device, or combinations thereof. Injection device includes all types of injection device, including all parenteral devices including pre-filled syringes, and auto-injectors.

An "injection member" as used herein includes but is not limited to a needle and/or a needle simulation device. The injection member may be partially or wholly surrounded by a shroud, a needle shield or an end of an injection device, in non-limiting embodiments. The injection member may or may not pierce through the pad component during use of the injection training device and/or system. An injection device with an injection member embodied as a needle may be used both for training with the injection training device/system and also for traversing the skin of a user to deliver a medicament, in one example.

The term "signal output component" as described herein includes but is not limited to a speaker or a display, and may provide an audio output such as a beep or a warning sound or spoken words or instructions, a visual output such as a light, a screen or a display, a combination of audio and visual output such as a video, for example, a gustatory or olfactory output, a tactile output such as a vibration, in some non-limiting examples.

Visual stimuli or feedback (visual output) can be generated mechanically or electronically from either the injection training device/system and/or the injection device. An example of a mechanically generated visual stimulus is an injection member puncturing through a surface of the pad component. An example of an electronically generated visual output includes one or more LED's blinking, an LCD display showing an icon, or key steps in the process of administration of medicament using the injection device being highlighted on a screen in the order required for proper administration of medicament, in non-limiting examples. A visual output as disclosed herein further includes, but is not limited to, a light, a display, a colorometric display system, a change in position of the injection device or any other type of visual cue to the user of the injection training device and injection training system described herein. The visual output is associated with the injection device or with the injection training device or system; therefore it may be associated with or disposed on either portion of the system or device or provided in connection with the system or injection training device either by a wire or wirelessly.

Additional visual outputs that may be incorporated into the system or device herein may include display devices having one or more layers of material having a light transmission region, a unit of information to be highlighted, and a light blocking region; and a backlight unit having a flexible, planar waveguide body, a light source configured to direct light into the waveguide body, and at least one light director associated with a portion of the waveguide body so as to direct light transversely to a plane of the waveguide body. The directed light travels through the light transmission region, and the directed light is directed toward the unit of information to be highlighted as provided in International Application No. PCT/US11/26976 and US National Stage application Ser. No. 13/582,560 which claim the benefit of U.S. Provisional Application Ser. No. 61/310,081, which are incorporated by reference in their entireties herein. The unit or units of information to be highlighted may include the stepwise instructions for administering the medicament to a user (or training a user) and may also provide the duration of each step by way of highlighting each step for a predetermined amount of time such that the user can follow the precise timing of each step in the sequence.

Auditory stimuli or feedback (audio output) can also be generated mechanically or electronically. An example of a mechanically generated auditory stimulus is the "click" that can be heard if two parts of a device interlock. An example of an electronically generated auditory stimulus is a beeper or a speaker that plays spoken instructions. An audio output as disclosed herein includes but is not limited to music, a sound, a beep, a series of beeps, music or sounds, a mechanical sound including clicking, a sound replication of operation or behavior of a drug delivery device containing medicament. These auditory stimuli, such as two parts of a device interlocking can be picked up by a microphone of the injection training system/device in some embodiments. The injection training device/system can then identify whether or not the injection device was used correctly (i.e., whether a step was performed correctly or in the correct order, for example). A combination of both visual and auditory output may include a video tutorial providing instructions to a user on correct administration of the medicament and/or use of the injection device and/or injection training device or system, for example.

Somatic stimuli or feedback, also called somatosensory stimuli or tactile feedback, is typically generated mechanically. In a typical embodiment of the injection training device or system, there are a large number of somatic stimuli, particularly with reference to the injection device, such as actuation forces, abrasion resistance, frictional forces, spring compression, the feel of a click of two parts interlocking, surface texture, vibrations, weight sensation, and any other similar stimuli or feedback known to those of skill in the art.

A "predetermined value" as used herein, for example, includes but is not limited to a value or range of values relating to an event involving use or operation of the injection training device, injection device, or system. These may include, but are not limited to thresholds, ceilings, baselines or range values that are desired or undesired for a particular event. Examples of predetermined values include, but are not limited to, a predetermined orientation value, predetermined time value, or a predetermined contact value, in addition to other predetermined values described herein refers to a value that is used as a reference value in relation to a value, signal, or indication that is detected by, for example, a sensor of the medicament device. Predetermined value may include an optimal value, or a sub-optimal value, or any value there between, or any combination thereof. The term "value" as used herein, may refer to a specific value or a range of values.

In one example, a predetermined perpendicularity value may include a 90 degree angle between the injection device and the injection training device or housing, an additional predetermined perpendicularity value may include a 10 degree angle between the injection device and the injection training device or housing. At either predetermined perpendicularity value, or at any value there between, a signal output component may be initiated. The signal output component may therefore be an error message or a congratulatory message, for example. This signal output component may be initiated from the injection training device or system.

The term "condition" as used herein includes but is not limited to one or a combination of a user input, a status of the injection device or the injection training device, anything that is sensed by the injection training device or system, correct or incorrect stepwise activities using the injection device, usage of the injection device over time, among other conditions.

The term "error condition" as used herein includes but is not limited to one or a combination of a condition pertaining to a mistake by the user in using the device, whether the mistake is incorrect positioning or contact between the device and the user, or whether the mistake is an out of order step, a step that exceeds or fails to meet predetermined time value (such as an undue pause during or between steps, or insufficient time for conducting a step or transition between steps). Error conditions may also include errors of the injection training device itself or of the injection device, including low or lack of power or failure to operate as intended. Error conditions may further include wet injections, wherein the injection device is activated while not correctly positioned in or on the user or in or on the injection training device or housing. Furthermore, a wet injection can occur when the injection device is removed from the user before an entire dose of medicament has been delivered to the user.

Any of the abovementioned outputs by the signal output component can be presented along with or in conjunction with any of the other outputs of the injection training device and/or system. For example, a visual and an audio stimulation or feedback may occur at the same time or within the same step of the training to enhance training of the user. Furthermore, the inventors have discovered that a combination of mechanical feedback (kinesthetic) and electronic feedback enhances the learning experience of a user when using the injection training system or device.

The term "associated" or "association," as used herein, includes but is not limited to direct and indirect attachment, adjacent to, in contact with, integrated with, and/or in functional proximity therewith (i.e., not necessarily in direct or indirect contact but close enough for the function of the associated components).

The term "sensor" or "sensors" as used herein may include but are not limited to, light sensors, fluid flow sensors, strain gauge sensors, temperature sensors, pressure sensors, tilt sensors, force sensors, level sensors, contact sensors, photoelectric sensors, magnetic sensors, ultrasonic sensors, electrochemical sensors, acceleration sensors, moisture sensors, humidity sensors, speed sensors, inductive sensors, capacitive sensors, and orientation sensors. Some of these sensors may require a supply of voltage. The injection training device/system may include one or more of the sensors described herein, for example, a contact sensor may be used to detect removal or placement of the injection device onto the injection training device, for example. In a further example, two or more contact sensors, more preferably thee contact sensors may be used to detect perpendicularity of the injection device relative to the injection training device. An example of an inductive sensor includes material embedded in or associated with the injection device, wherein said embedded or associated material proportionally changes the magnetic field of the inductive sensor which may be associated with or embedded in the pad component, depending on its distance away from the inductive sensor. The sensor then outputs a variable electrical signal based on the distance between the embedded or associated material and the inductive sensor.

In an embodiment, an injection training device configured to interact with an injection device having an injection member is provided herein. The injection training device includes a housing having an opening, a pad component disposed in the opening, wherein the pad component is configured to receive an injection member of an injection device. The injection training device may further include a signal output component and circuitry associated with the housing to receive information about the operation of the injection device and to provide a communication about an operation of the injection device to a user of the injection training device through the signal output component.

The circuitry of the injection training device may provide for storage of an injection training history of a user including what error conditions occurred during use of the device, how many error conditions occurred during use of the device, when the training or use of the device occurred and other related variables.

In a further embodiment, the injection training device may include at least one sensor. The at least one sensor may be provided to detect a condition of the injection device and/or of the injection training device, wherein an output of the injection training device from the signal output component is initiated in response to a predetermined value for a condition, in one non-limiting embodiment. One or more sensors may be provided on or in or associated with the injection training device or housing of the injection training device, in an embodiment. In one embodiment, a sensor may be provided on the housing of the injection training device. The sensor may be a pressure sensor, for example, provided to detect the pressure or force of the injection device on the pad component of the injection training device, in a non-limiting embodiment. The sensor may be any other type of sensor described herein or known to those skilled in the art to be used for different measurements including the detection of position, location, perpendicularity, orientation, proximity, force or pressure, contact, temperature, and fluid flow, among other features as described herein. The sensor may include at least one of a light sensor, a contact sensor, an orientation sensor, a capacitive sensor, an inductive sensor, a flow sensor, a pressure sensor, a strain gauge sensor, a tilt sensor, and a temperature sensor, for example.

In a further embodiment, the injection training device may be associated with a user interface. In yet a further embodiment, the communication provided by the injection training device comprises an instruction to the user for using the injection device, said instruction is based on information received by the injection training device. In still a further embodiment, the injection training device is configured to provide stepwise instructions for administering an injection to a user.

In an embodiment, the pad component includes a skin layer and/or a subcutaneous layer, the skin and subcutaneous layers being configured to mimic human or non-human animal skin and subcutaneous tissue. In a further embodiment, the skin layer and/or the subcutaneous layer of the pad component mimics the puncture resistance of skin and/or subcutaneous tissue of a human or non-human animal. The skin and/or subcutaneous layers of the pad component are of such a material so as to closely mimic the look and feel of human or non-human animal tissue. In yet a further embodiment, the pad component includes an absorbent material and may be removable.

In a further embodiment, two or more sensors may be provided in or on the housing of the injection training device. In a particular non-limiting embodiment, the two or more sensors may be disposed substantially equidistant from one another around the housing or associated with the pad component of the injection training device in order to provide composite sensor values to detect an angle (i.e., perpendicularity) of the injection device relative to the injection training device, for example. In yet a further embodiment, three or more sensors may be disposed substantially equidistant from one another around the housing of the injection training device or associated with the pad component to detect and provide composite sensor values from which the angle (i.e., perpendicularity) of the injection device relative to the pad component and/or the housing can be determined.

In one particular embodiment, the at least one sensor may be an orientation sensor provided to detect an orientation of the injection device, wherein the signal output component is initiated if the orientation of the injection device meets a predetermined orientation. The orientation dictates the position of the injection training device and/or system, or the injection device relative to another object, for example, relative to the user during use of the system or device. In some instances, particular drug delivery devices must be oriented in a certain orientation for optimal drug therapy results. For example, in regard to parenteral administrations, the injection device must be oriented such that the needle is beneath, in some instances, the body part being injected so as to avoid air bubbles in the medicament while in the device prior to its injection into the user. In other embodiments, the needle must be angled in a downward facing direction toward the target area to remove any air that may be contained within the medicament chamber or needle portion.

Certain medications may require certain modes of delivery or application, and may dictate the orientation of the injection device during use. An orientation sensor is useful in identifying the proper orientation for the device based on the medicament being administrated or the type of injection device.

In another embodiment, a contact sensor may be provided on or in or in association with the injection training device housing or pad component to detect a contact or insufficient contact between the injection training device and the injection device, wherein the signal output component is initiated if the contact of the injection device meets a predetermined contact value, or in other instances if the contact of the injection device fails to meet the predetermined contact value. This predetermined contact value may be set at 100% contact between the injection device and the portion of the injection training device being used (i.e., the pad component), or the contact value may be set between 90-99%, or 80-88% contact such that a user can be made aware when there is sufficient contact between the injection device and the injection training device for correct use of the injection device. The sensor can be configured to sense the angle between a longitudinal axis of the injection device and the injection training device (i.e., pad component). Additionally, or alternatively, in some circumstances contact sensors may be provided on the portion of the injection training device which is intended to contact the injection device, therefore the contact sensor can alert the user when sufficient contact has been made. In still a further embodiment, one or more contact sensors may be disposed on the injection training device between the housing and the pad component. Alternatively, the contact sensor(s) may be disposed on an under portion of the pad component between the housing and the pad component. The contact sensor may alert the user when sufficient contact has not been made between the injection device and the injection training device.

Contact sensors may be provided on the pad component, or in or around the injection training device housing, for example. These contact sensors may be provided to open or close a circuit within the injection training device to provide feedback to a user.

In another embodiment, a microphone may be included to detect movement of parts of an injection device relative to one another, such as clicks from an auto injector, for example. These sounds may indicate correct or incorrect usage of the injection device to a user of the injection training device and/or system. A microphone may further be provided to detect any sound from the injection device and to alert a user, in some embodiments. A communication about an operation of the injection device may be provided through the signal output component based on the one or more sounds received by the microphone from the injection device, in one embodiment. In one particular embodiment, the injection device is an auto injector and the one or more sounds include at least a first sound and a second sound, wherein a first sound is detected by the microphone component once the auto injector is activated and the injection member is extended, and the second sound is detected by the microphone component after a complete dose of a medicament contained within the auto injector has been delivered through the injection member.

In a further embodiment, the injection training device includes a sensor, the sensor being configured to detect the presence of the injection member in the pad component, wherein when the sensor detects the presence of the injection member in the pad component before the microphone component detects the first sound of the auto injector, and the sensor detects no presence of the injection member in the pad component before the second sound of the auto injector is detected, the circuitry detects that an error condition has occurred and an error message is communicated through the signal output component. The error message may include, for example, "A wet injection has been detected. Please do not remove the injection device from the pad component until all of the medicament has been delivered from the injection device."

In a further embodiment, the injection training device may include a controller. In still a further embodiment, the injection training device detects a condition of the injection device. In some embodiments, the condition of the injection device is compared to a predetermined condition for the injection device. In a further embodiment, an output from the signal output component is initiated in response to a predetermined value detected for a condition.

In a further embodiment, the at least one sensor is provided to detect alignment of the injection device during operation of the injection training device. In still a further embodiment, the signal output component is initiated if the detected alignment of the injection device meets a predetermined alignment value, or in some instances, fails to meet a predetermined alignment value.

The term "force value" as used herein includes but is not limited to an amount of force required to initiate a response. For example, a force value may include a threshold force required to be provided onto the pad component surface by the injection device in a drug delivery injection device in order to correctly and accurately administer an injection to a user. The force values may vary based on the type of injection device being used and/or the type of medicament being administered, among other variables. A force value may also include a change in force detected by the device and/or system.

The term "connected" as used herein includes wireless or wire connection. The external source includes a database, a remote computer, a Smartphone, and also includes communications with another device, a network, and any other means of communication of or transfer of information known in the art. Connected may further refer to a direct surface to surface connection between the device and another surface or an indirect contact there between. In some embodiments, the injection training device and/or system may communicate with a remote device either via a wired or a wireless connection. The remote device may be, for example, a remote communications network, a computer, a cell phone, a personal digital assistant (PDA) or the like. Such an arrangement can be used, for example, to download replacement processor-readable code from a central network to the memory module or other memory of the injection training device and/or system or from the injection device. In some embodiments, the circuitry of the injection training device can download or obtain information associated with an injection device or particular medicament, such as an expiration date, a recall notice, updated use instructions or the like.

In a further embodiment, the injection training device includes a microprocessor. In still a further embodiment, the injection training device includes a memory module. The memory module described herein may include a script for guiding the user through the steps of the sequence, said script may be stored and provided in different languages. The memory module may further include information regarding a condition of the user, information about a medicament, or information about the injection device. The memory module may be removable from the device.

The term "communicatingly connects" as used herein includes both two way communication and one way communication such as input received from the injection training device, for example, an auditory signal or visual signal, for example, electromagnetic induction, RFID, Bluetooth connection, wireless and wired connections.

The network interface can be configured to transmit information to and/or from the circuitry of the injection training device and/or system to and/or from a central network, such as, for example, an emergency response network. In some embodiments, for example, the injection training device and/or system can notify an emergency responder when and how an injection device is used. In other embodiments, the injection training device and/or system can transmit information to and/or from a third party, such as a physician, an emergency contact and/or the manufacturer of an injection device, when and how the injection device is used. Such information can include, for example, the location of use, the date and/or time of use, the efficiency of use including conditions and errors of use, or the like.

An indicator as described herein can be used indicate information to a user about a condition of the injection training device and/or system, and/or about the injection device to a user. The indicator can be used to indicate to a user that a particular step or that the entire simulation is complete, or that the particular step or simulation is nearing completion, in non-limiting examples. The indicator may indicate to a user once the period of time has elapsed for which the injection member must be kept into the pad component at which time the injection member is retracted into the injection device in an auto-injector, for example. In some instances this time period is referred to as a "dwell period". Otherwise the indicator may only indicate to a user once the entire process has been completed and the injection member is retracted, in another non-limiting embodiment. Additionally, the indicator could provide a countdown of the amount of time remaining in one injection event and/or in a training event.

The indicator can also indicate predetermined statuses including elapsed time, and insufficient time between steps, for example. There may be one or more indicators, and each indicator may provide an indication to the user that the training is complete by an audio, visual, tactile, or a smellant (olfactory) indication, taste indicator (gustatory), or a combination thereof. The indicator may include one or more LED's, in a non-limiting example.

Parenteral delivery devices and trainers described herein include, but are not limited to, any type of device (for delivery or training and/or simulation) which provides administration of a medicament or simulation thereof via intravenous or intramuscular injection, for example, such as an autoinjector, a pre-filled syringe, IV fluid therapy including total parenteral nutrition methods (TPN), peripherally-inserted central catheter (PICC) line, or other related devices. The injection training device and/or system embodiments herein also include but is not limited to work in conjunction with injection devices for intravenous administration by liquid, capsule, tablet, or spray. Injection devices for administration or training by injection, whether intramuscular, intravenous, intraperitoneal or by any parenteral route are also contemplated herein. Injection training devices and/or systems which work in conjunction with injection devices for parenteral administration by bolus injection or by continuous infusion are also contemplated herein.

In one embodiment, the injection training device includes an attachment component. The attachment component is configured to attach the injection training device to a user in one embodiment. In another embodiment, the attachment component is configured to attach the training device to an object. Additional attachment components may be provided.

In a further embodiment, the injection training device includes a protective shield disposed below the pad component, said protective shield configured to block passage of the injection member there through.

In another embodiment, an injection training system configured to provide instructions for using an injection device to a user in a sequence of steps is provided. The injection training system includes a housing, the housing including an opening. The system includes a pad component disposed within the opening, and an injection device having an injection member, the injection device communicatingly connects to the housing, and pad component is configured to receive the injection member. The system further includes a user interface, a signal output component, and circuitry associated with the housing. The circuitry may be configured to control provision of the instructions to the user in the sequence of steps, wherein the injection training system may be configured to provide a communication about an operation of the injection device to the user through the signal output component, in an embodiment.

The circuitry may include at least in part, a microprocessor, a signal output component for initiating audio, and/or visual, outputs, among other electronic components. The components may be operatively coupled by electrical conductors, however, in other embodiments the components may be operatively coupled without being physically connected. For example, in some embodiments, at least a portion of the components included in an electronic circuit system can be inductively coupled. In other embodiments, at least a portion of the components included in an electronic circuit system can be evanescently coupled.

The circuitry may include a flexible printed circuit board to electronically couple with the components contained therein. The circuitry may be disposed in any suitable manner relative to the housing of the injection training device, or may be associated with the housing of the injection training device. In some embodiments, for example, the circuitry can be integrated with the injection training device. The circuitry can be contained within the housing, and/or it may be partially or fully assembled concurrently with and/or with the same processes of the injection training device, the circuitry may alternatively or in addition be provided on the outer portion of the housing of the injection training device.

In yet another embodiment, a non-transitory computer-readable medium embedded in a medicament delivery training device is disclosed. The non-transitory computer readable medium stores instructions executable by the microprocessor or another processing device to cause the processing device to output audio via the signal output component in the medicament delivery training device in response to an activation of a responsive member on a control interface of medicament delivery training device to guide a user through the stepwise instructions for operation of the medicament delivery training device in response to the user input and to instruct the user to actuate the actuation member of the device to simulate an actual medicament delivery in response to an actuation of the actuation member of the device.

Some embodiments of the injection training device and/or system may include a computer storage product with a computer-readable medium having instructions or computer code thereon for performing various computer-implemented operations. The media and computer code may be those specially designed and constructed for the purposes of embodiments of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

In a further embodiment, the injection device communicatingly connects to the housing with a wired connection and/or a wireless connection. In still a further embodiment, the wireless connection includes Bluetooth® technology and/or Radio-Frequency Identification (RFID) technology. In still a further embodiment, an output of the system from the signal output component is initiated in response to a predetermined elapsed time value period occurring within the sequence of steps. In yet a further embodiment, the predetermined elapsed time value period includes a pause between the sequence of steps, wherein an output of the device from the signal output component is initiated when the user performs one or more steps in the sequence of steps within a predetermined time period, in one example.

A user interface, as mentioned above, may be provided on the injection training device or injection training system and/or associated with the system or device either directly or indirectly. The user interface can be used for generating user commands, and the circuitry disposed within the injection training device or in association with the device or system is in communication with the user interface. The circuitry may be embodied as a processor-based circuit, wherein it is configured and arranged to receive input from the user via the user interface, wherein the processor-based circuit includes an audio signal processor configured and arranged to provide audio to the user to instruct the user while using the system during the training wherein the audio may be controlled by a responsive member on the user interface via user input.

The injection training device and/or system may include at least one responsive member that is reactive to user input. The responsive member may include a button, either virtual or non-virtual, a switch, a touch sensor, a toggle, a heat or tactilely sensitive response sensor, or any combination thereof, or any other such device as known in the art. The responsive member may be part of the user interface of the injection training device or system.

The user interface may provide the user with the ability to change the language of the audio output of the injection training device. Languages in which the audio output may be communicated to a user include but are not limited to, English, Spanish, French, Arabic, Portuguese, Russian, Chinese, Vietnamese and Japanese. It is known to those of skill in the art that any language may be provided via the audio output of the injection training device. User controls such as on/off controls, play/pause controls, previous, selected language or set volume may be controlled through the user interface. However, in some embodiments, the on/off and play/pause/stop features of the system may be controlled by simply placing the injection device in communication with the injection training device either directly or indirectly, by way of a sensor that detects removal and replacement of the injection device relative to the injection training device and/or system. Alternatively, the system or injection training device may be powered on or off automatically or after a predetermined time period.

Certain embodiments of the injection training device and/or system may have error recognition and correction capabilities, and others may include an algorithm which can track the sequence of scripts or instructions and retrieve, at a certain time, the proper script or instruction from a lookup table. Some embodiments may include audio instructions only, and others may include video instructions, table display instructions and/or a combination of any or all of the above, for example. Other embodiments of the injection training device and/or system may include user and/or sensor inputs as interruptions to the script or instructions provided by the system.

Communication between the injection training device and/or injection training system and the injection device may be established by a wired or a wireless connection. An example of a wireless connection is by way of a Bluetooth® transceiver. An antenna may be required and the injection training device and/or system may require power as described above. Components of this communication type may be in both the injection training device and/or system and the injection device, for example. Another method of communication includes a wire communication using a data communication bus, or device interface bus such as $I^2C$ or PCI bus, for example. Another example of communication between the injection training device or system and the injection device includes communication between an RFID transponder and an RFID reader. Either one of the transponder and the reader can be in the injection training device and/or system and the other component in the injection device. In one embodiment using the RFID technology, one way communication of data can occur. The RFID transponder can be powered by the RFID reader and therefore does not require a battery. In one example, the injection device can include the RFID reader and the injection training device can include the RFID transponder such that the injection device does not require a battery and can be more compact in size than that which is typically available.

In still a further embodiment, an injection training device configured to interact with an injection device having an injection member, the injection training device configured to provide instructions for using the injection device to a user in a sequence of steps and including a housing having an opening is provided herein. The injection training device further includes a pad component disposed within the opening, the pad component configured to receive an injection member of an injection device, a user interface, a signal output component configured to provide communication from the injection training device to the user, one or more sensors, wherein at least one of the one or more sensors is associated with the pad component and at least one of the one or more sensors is configured to sense a presence of the injection member, and circuitry is associated with the housing. The circuitry may include a timekeeping component to record one or more time values, wherein said circuitry is configured to provide a communication about an operation of the injection device to a user based on the presence of the injection member sensed and a time value recorded by the timekeeping component.

In a further embodiment of the injection training device, an error condition is detected if a value received from the one or more sensors does not meet a predetermined value for the one or more sensors. In still a further embodiment, an output of the injection training device from the signal output component is initiated in response to an error condition detected. In still a further embodiment, the one or more sensors comprise a force sensor, the force is sensor configured to detect a force value by sensing a force applied to the pad component by a portion of the injection device. In other embodiments, a microprocessor and/or a memory module may be provided as associated therewith. In a further embodiment, the one or more sensors include a contact sensor, the contact sensor is configured to detect a contact value based on a contact between the injection member and the pad component. In still a further embodiment, the injection training device includes an attachment component configured to attach the injection training device to a user. In one embodiment, the force value detected includes a change or changes in force.

In a further embodiment, the injection training device detects a condition of the injection device and/or the injection training device. In one particular embodiment, the condition is a user input. In a further embodiment, the condition is a status of the injection training device and/or the injection device. In another embodiment, the condition includes an input sensed by the injection device and/or the injection training device. In another embodiment, the condition includes at least one correct step or at least one incorrect step performed by the user with the injection device according to the instructions provided by the injection training device. The condition may include, for example, usage of the injection training device and/or the injection device. The condition may be an error condition as defined herein. The error condition may be, for example, a use of the injection device in an incorrect manner, or a failure to complete a step in the use of the injection device, or a failure by the user to use the injection device to perform one or more steps in the sequence within a predetermined time period, in non-limiting examples.

In a further embodiment of the injection training device, three or more sensors are positioned substantially equidistant from one another on the injection training device, said three or more sensors are configured to detect an angle of the longitudinal axis of the injection device relative to a surface of the pad component. In still a further embodiment, the injection training device comunicatingly connects to an external source and/or a remote device with a wired and/or a wireless connection. The remote device may be, for example, a Smartphone. The wireless connection may include, for example, Bluetooth® technology and/or Radio-Frequency Identification (RFID) technology.

Embodiments of the invention may include a printed circuit board with a simple microcontroller. The microcontroller runs the embedded software and interacts with memory. A timer may be included in the microcontroller. The microcontroller may incorporate an audio processor (see below).

Audio Processor

Audio implementation may include a digital audio processor (codec+amplifier) and a speaker. The audio technology in the package may have some or all of the following characteristics: peak volume dB (SPL) at 1 meter (3.2 feet) is at minimum 55 dB (at 850 Hz), the bit depth of the audio chip is 16-bit, the audio sampling rate is 16 kHz, maximum bit rate (hardware) is 256 kbps, available memory size for audio storage is 32 MB, in non-limiting examples.

Power Source

Embodiments of the invention may be powered by batteries, in one example. The medicament training container may include a battery, which can be larger than the battery in the medicament device. As a result of the various non-limiting examples of architectures described herein, the medicament device battery can be very small in some embodiments. Batteries in the container can be large and rechargeable and/or replaceable. Primary and secondary batteries may be included for backup. The container may be powered through a converter which plugs into an outlet. Alternatively, a charger and/or cradle can be used to charge the components of the system described herein.

The injection training device and system described herein may detect insertion of an injection member (i.e., a needle, or needle simulator) of an injection device into the pad component of the injection training device, for example. In other embodiments, the injection training device or system can detect the pressure from an end of an injection device whether or not an injection member is inserted into the pad component. The injection training device and/or system can be used to detect the amount of force or pressure exerted upon the portion of the injection training device and/or system by the injection device (either the injection member or end of the injection device), for example, and can indicate to the user of the device and/or system whether the correct amount of pressure or force for the correct amount of time was used, or whether the correct orientation of the injection device relative to the injection training device/system was used.

The injection training device/system can also be used to provide a corrective instruction if an incorrect amount of force, time, orientation, etc., was detected during the use of the injection training device/system by the user. With shield-activated auto-injectors, for example, the injection training device/system can be used to detect whether the correct amount of force is used to activate the injection device by the user for correct use of the injection device. These shield-activated auto-injectors are actuated by holding the auto-injector such that the shield portion is in contact with the target area for the injection and pressing in a downward motion toward the target area until the injection member (i.e., needle) is ejected from the auto-injector into the target area. A predetermined amount of force is needed to activate this feature of the auto-injector and the injection training device/system as described herein can detect the amount of force used by the user, for example, and may provide an error message and/or corrective instruction to the user if the incorrect amount of force was used, or a confirmation to the user that the correct amount of force was used.

Oftentimes with auto-injectors (and other types of injection devices), sounds are used to provide confirmation of correct and/or incorrect usage of the device to a user. The injection training device/system described herein can interpret the sounds, for example the clicks of an auto-injector, to provide information about the usage of the injection device to the user. Some auto-injectors have two clicks, a first click when the auto-injector is activated and a second click when the injection is complete. The injection training device and system can detect these clicks using a microphone component, in an embodiment, and provide information to the user based on the sounds received by the microphone component.

In some instances, the injection training device/system is able to detect a difference in the quality of the sound including, but not limited to, differences in pitch, tone, strength, source, etc. The injection training device and system may provide an output to a user based on the sound(s) received. For example, in certain auto-injector devices, a first click may indicate that the auto-injector has been activated is typically louder than a second click which indicates that the medicament has been delivered through the injection member. The injection training device and system can detect a difference between these sounds and provide an output through the output component to the user based on the sounds detected from the use of the injection device by the user. This is particularly useful, for example, to detect whether a wet injection has occurred (or would occur in a drug delivery device in instances where the injection device is a training or simulation device).

In some embodiments, the injection training device and/or system can be used with injection devices which expel a fluid. The pad component is provided to absorb fluids in a variety of viscosities. The pad component or a portion thereof is removable and replaceable. The replaceable portion of the pad component (or the pad component itself) is easily removable and replaceable, does not require fine dexterity, and can be completed quickly. This feature is particularly beneficial for patients suffering from arthritis or other similar conditions.

In an embodiment, the injection training device and/or system may include logic embedded in the circuitry therein, and can detect user errors in the use of the injection training injection training device/system and/or the injection device in real time. Through the use of sensors and, in some instances, a memory module, information can be gathered about the use of the device/system by a user, and can be compared to predetermined values. The logic of the injection training device/system allows the device/system to detect whether a user follows the correct sequence of steps, whether a wet injection has occurred (in which case, as aforementioned, the user has prematurely removed the injection device from the injection site—the injection device is removed prior to completion of the injection), or whether the injection device is oriented correctly relative to the injection training device (more specifically, relative to the pad component surface), in non-limiting embodiments.

After detecting an error (i.e., error condition) the user may be alerted to the error by way of the output component of the injection training device and/or system. The device/system can alert a user and/or assist a user in correcting the error committed and preventing the error in the future by providing auditory feedback (i.e., a buzzer or spoken instructions, for example), visual feedback by way of a display or an LED, in non limiting examples, teach a patient how to correct the error, and provide confirmation to the user when the user performs one or more steps correctly. Confirmation to the user may be provided in any of the ways provided herein, including auditory, visual, gustatory, olfactory, tactile and other forms of feedback discussed.

The housing of the injection training device and system includes a protective shield portion which prevents a user from sticking oneself with a needle of an injection device, for example. Because the injection training device and system can be used with any injection device on the market, including drug delivery devices with needles as well as training devices, the protective shield of the injection training device and system prevents a user from sticking himself, particularly when the injection training device/system is attached onto the user or disposed on the user in some fashion. In one embodiment of the injection training device/system described herein, an attachment component is provided to attach the housing onto a user, for example, around a user's abdomen, arm, or thigh, to further enhance the simulated experience of an injection. The attachment component may be adjustable, and may include a strap with an adjustable closure.

In some embodiments, the injection training device and system is self-contained, self-powered and portable. All electronics are fully contained within the device/system, and sufficient memory is provided within the device/system to store embedded software and scripts in at least two languages, for example. The injection training device and/or system can decompress and decode digital an audio files from any compressed audio format. The injection training device and system complies with FCC, EMI and EMC standards. Volume of the device/system may be adjustable by a user in some embodiments.

In one embodiment, the injection training device and/or system may be powered by batteries. Batteries are contained within the device and are used to power the electronics of the injection training device and/or system. For battery activation, the pull tab shall be designed to accommodate for low pinch strength users, for example.

Turning to the Figures, FIG. 1 provides a perspective view of an embodiment of an injection training device 100 which is configured to interact with an injection device 11 (not shown in FIG. 1). The injection training device 100 embodiment includes a housing 10 with an opening 12 for receiving a pad component 14. The device 100 also includes a user interface 16, a signal output component 18 (not shown in FIG. 1), and circuitry there within (not shown in FIG. 1). The injection training device embodiment 100 provides a communication about an operation of the injection device to a user of the injection training device through the signal output component 18. FIG. 1 also provides an embodiment of an attachment component 30 associated with the housing, which can be used to attach the injection training device 100 to a user or another object during use of the device 100. For example, the attachment device may be a band or tape that can be wrapped around an object or a body part of the user. The band may include an elastic material such that it can be retained on a portion of the body or onto an object during use of the injection training device and/or system. The band may allow for multiple attachment orientations based on the interface to the housing.

Figure 2:
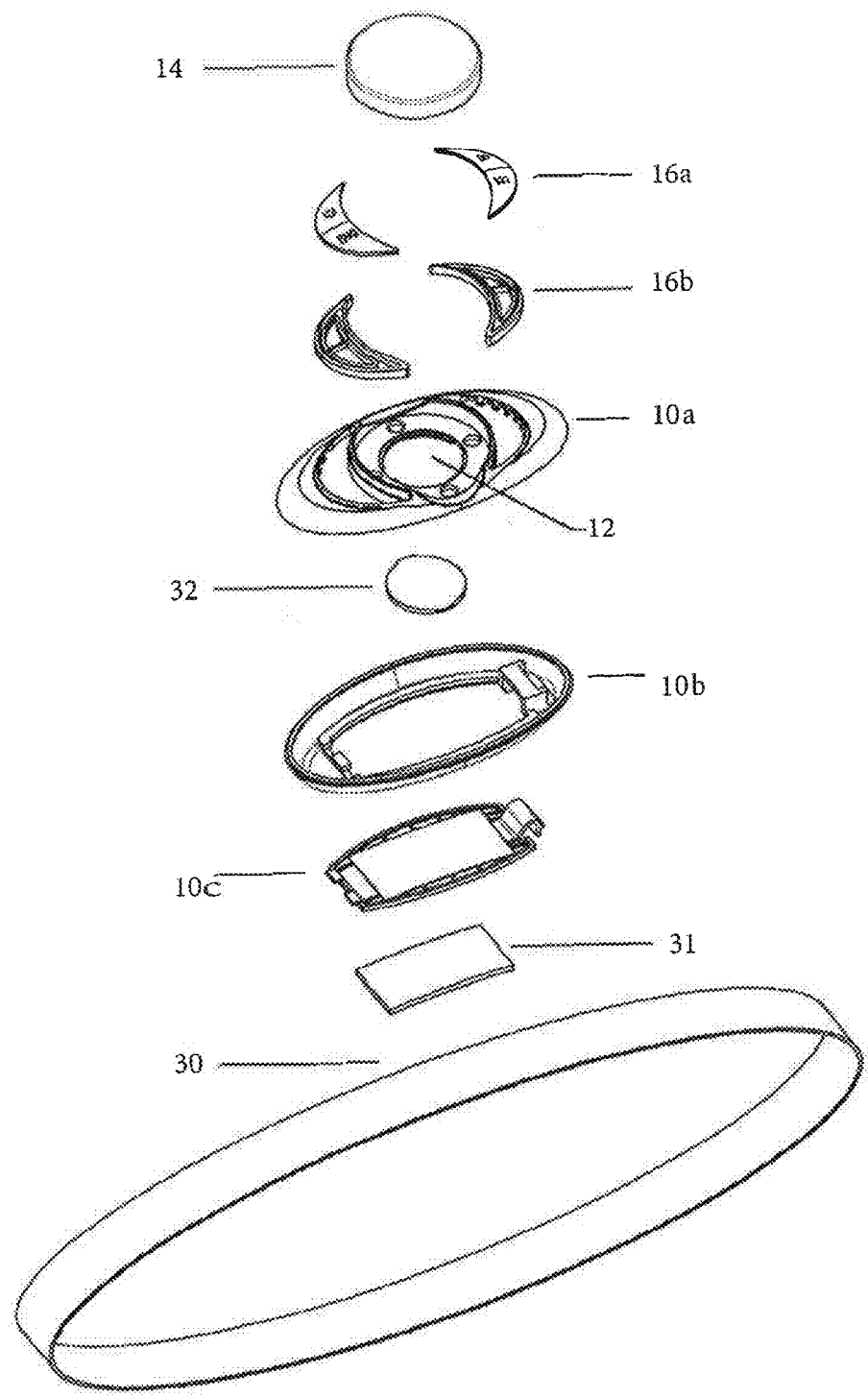
FIG. 2 provides an exploded view of the injection training device embodiment shown in FIG. 1.

FIG. 2 provides an exploded view of the injection training device 100 embodiment shown in FIG. 1. The pad component 14, the user interface comprising responsive members 16a, and responsive member holder 16b are also provided. When the injection training device 100 is assembled, responsive members 16a are provided on the responsive member holder 16b portion of the user interface shown in FIG. 2. The user interface 16 is shown as a number of control buttons in the embodiment shown herein, although the user interface may also include one button, one or more virtual buttons, a touch screen or panel, a control interface, or any other user interface known to those skilled in the art. The user interface may be provided on the injection training device, on the injection device or associated with the injection training device and/or the system either directly or indirectly. The user interface 16 can be used for generating user commands, and the circuitry disposed within the injection training device or in association therewith may be in communication with the user interface. The housing 10 is shown in three components 10a, 10b, and 10c in the exploded view of FIG. 2, which is optional for manufacturing purposes. Alternatively the housing components 10a, 10b, 10c, may be together as one solid piece. A protective shield 32 is shown in FIG. 2. When the injection training device 100 is assembled, the protective shield 32 is disposed beneath the pad component 14 to prevent a needle from an injection device from puncturing a user through the pad component 14. The attachment component 30 may be associated with the housing 10 by way of an attachment member 31, wherein the attachment member or members 31 may include but are not limited to Velcro or adhesive, among other attachment members known to those skilled in the art.

FIG. 3 provides an exploded view of another embodiment of an injection training device 200 with a pad component 14, sensors 22a, 22b, and 22c on the housing 10, signal output components 18 embodied as lights and audio (i.e., speaker), and a power source 26 shown as a battery in the housing 10. Circuitry 20, includes a memory module 24 and a microprocessor 28 that are provided in the housing 10 of the injection training device embodiment. A near field communication component 36 is provided in the housing 10, and may provide for communication to or from the device 100 by RFID, for example, as described herein. As aforementioned, an RFID transponder may be provided in the housing 10 (shown as near field communication component 36), and the RFID reader can be disposed in or on the injection device. The sensors 22a, 22b and 22c may be sensors of one type, for example, force sensors configured to sense the force from the injection device onto the pad component, wherein the values received from the sensors are used to detect a force from the injection device, or sensors used to detect a perpendicularity of the injection device based on composite sensor values or a comparison of the values from each sensor. In another example, values from the sensors may be used to detect a location of the injection member 13. Alternatively, each one of sensors 22a, 22b, or 22c, may be a different type of sensor, for example, in one non-limiting embodiment, 22a may include a pressure sensor, 22b may include a light sensor and 22c may include a contact sensor. FIGS. 4A-C provide sectional views of the components of the injection training device 200 embodiment provided in the exploded view of FIG. 3.

FIGS. 5A-5B provide perspective views of an injection training system embodiment 300 including an injection device 11 in association with a pad component 14 of the injection training device housing 10. The injection training device housing 10 also includes a user interface 16. The injection device 11 in FIG. 5A is aligned such that its longitudinal axis is generally perpendicular to the horizontal axis of the pad component 14 and an end of the injection device 11 containing the injection member 13 (not shown) abuts the pad component 14. In the perspective view of FIG. 5B, the injection device 11 is not perpendicular to the pad component 14, but is slightly tilted at an angle. There are various types of injections that require varying angles between the injection member and the target surface for optimal results and accurate medicament delivery. Some medications require a 45 degree angle between the injection device 11 and the target surface of the user; other medications require a 90 degree angle between the injection device 11 and the target surface of the user, for example. Still other medications require angles there between. Consequently, the circuitry of the injection training device will be pre-programmed with the information regarding angle requirements for injection and delivery of certain medicaments and will guide and train a user to ensure the medicament device 11 is positioned at the correct angle relative to the housing or pad component 14 of the injection training system 300. Various sensors, in non-limiting embodiments, sensors 22a, 22b, 22c, and 22d are shown as positioned within the housing 10. They may be positioned within the pad component 14, the housing, or both, and in some examples, with sensors in the injection device 11, in some embodiments, the angle of the injection device 11 relative to the housing 10 or pad component 14 of the system 300 can be detected, in non-limiting embodiments. For example, in a non-limiting embodiment two or more sensors spaced generally equidistant from the center of the pad component can be used to detect the angle of the injection device 11 relative to the pad component 14. More particularly, three or more sensors positioned generally equidistant from the center of the pad component in association with either the pad component or the housing, for example, can be used to detect the angle of the injection device 11 relative to the pad component 14 or the housing 10, in a non-limiting embodiment.

FIG. 5C provides a cross-sectional view of the injection training system embodiment 300 as shown in FIGS. 5A and 5B, wherein the injection member 13 is shown as ejected from the injection device 11 into the pad component 14.

FIG. 6 provides a perspective view of an injection training system 300 embodiment, configured to provide instructions for using an injection device 11 having an injection member 13, to a user in a sequence of steps. The injection training system 300 includes a housing 10 with user interface 16, and a pad component 14 are provided. The pad component 14 is disposed within the opening 12 (not shown in FIG.6) of the housing 10 in the embodiment shown herein. An injection device 11 is communicatingly connected to the housing 10 in the embodiment of FIG. 6. The connection may be a wired or a wireless connection, and is shown as a wireless connection, for example, as lines 33 in FIG. 6. Furthermore, the injection training device housing 10 may further be communicatingly connected to an external source and/or a remote device by either a wired or a wireless connection. The injection training device housing 10 may be connected to a Smartphone device, in a non-limiting example, by a wired or a wireless connection. A signal output component 18 is provided and circuitry (not shown) is associated with the housing 10. The circuitry is configured to control provision of the instructions to the user in the sequence of steps wherein the injection training system is configured to provide a communication about an operation of the injection device 11 to the user.

Figure 7:
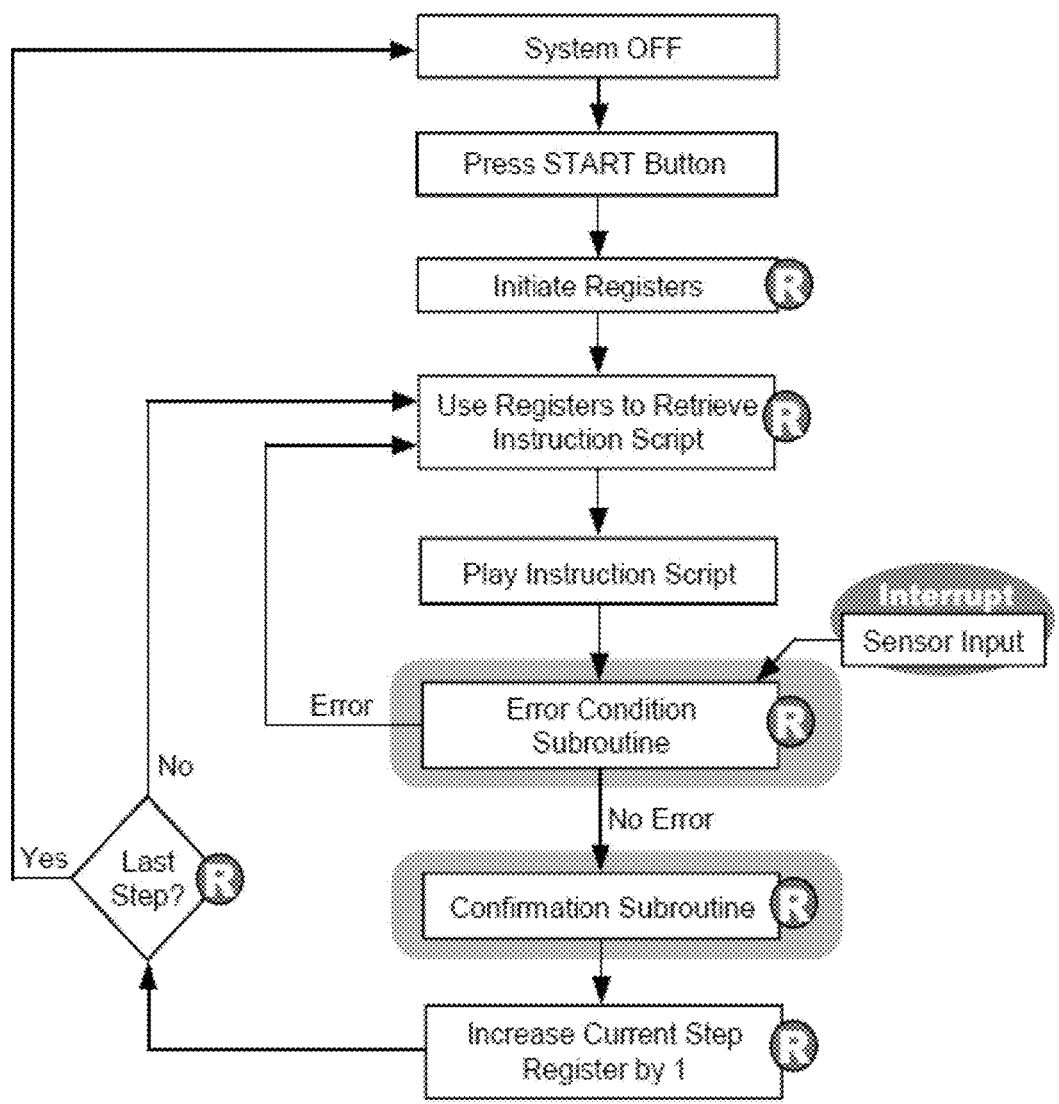
FIG. 7 is a flow chart providing an example of one embodiment of the operation logic of an embodiment disclosed herein.

FIG. 7 provides an example of one embodiment of the operation (or logic) of circuitry of an injection training device disclosed herein. A start button associated with either the injection device (training device or drug delivery device) or the injection training device housing is activated. Registers in the circuitry are initiated. Register values are set based on events in some embodiments. Registers values are used to retrieve instruction script(s) for providing instruction to a user. The instruction script is played to a user. If an error condition is detected based either on use of the injection device by a user in relation to the injection training device (based on information received from sensors or based on out of order steps, for example) an error condition subroutine is played (see FIG. 8 for more information on error condition). The registers are then used to retrieve instruction script pertaining to the error condition identified. If no error occurs, a confirmation subroutine (script) may output to the user to indicate to the user that the user performed that step correctly (shown also in more detail in FIG. 8). After the confirmation subroutine is output to the user, the current step register is increased by one step. If it is not the last step in the instructions, the logic moves onto the next step to retrieve instruction script for the subsequent step. If the user is at the last step in the instructions, the system may be powered off automatically in some embodiments.

Figure 8:
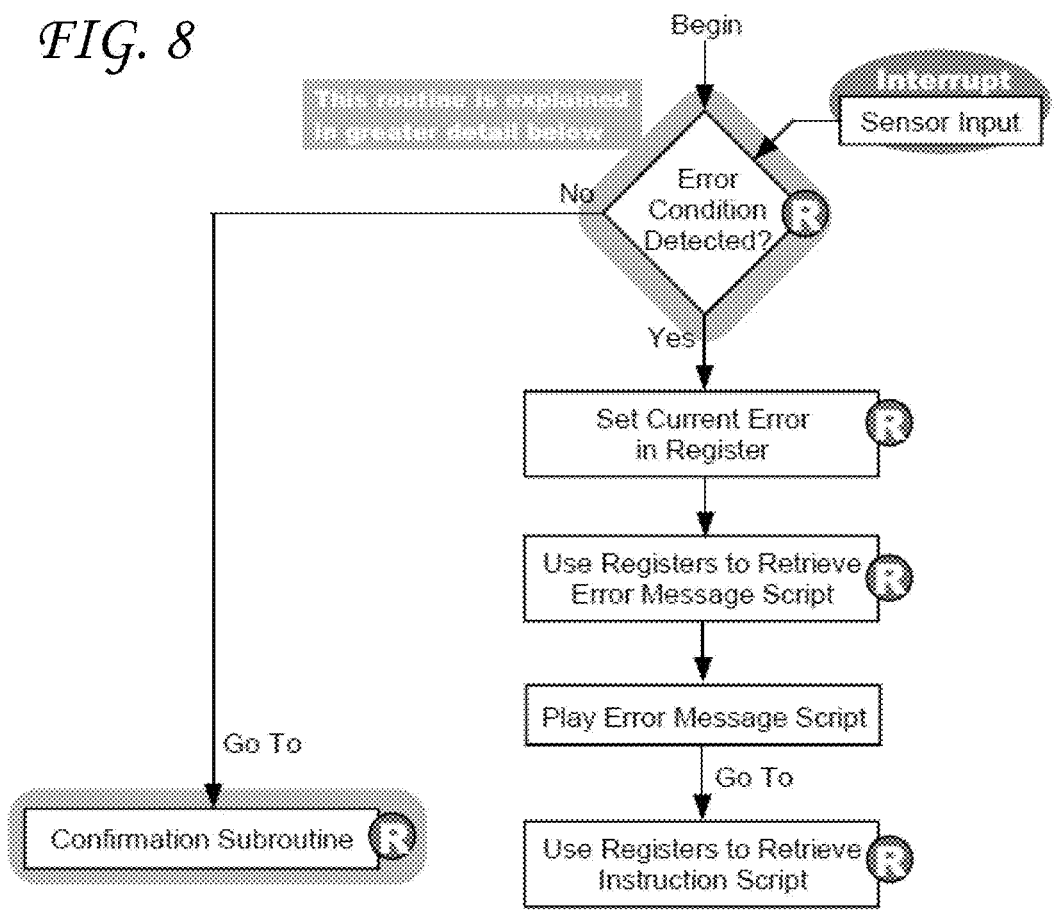
FIG. 8 is a flow chart demonstrating an embodiment of the operation logic as it relates to an error condition being detected by the injection training device or injection training system embodiments.

FIG. 8 provides a flow chart demonstrating the logic of circuitry of an injection training device as it relates to an error condition being detected by the injection training device embodiment 100, 200, or injection training system 300. Once an error condition is detected, current error is set in the register. The registers are used to retrieve an error message script to be output to the user. Once the error message is output or played to the user, the registers are used again to retrieve instruction script for the step. If no error condition is detected, the confirmation subroutine is played or output to a user.

If the error condition subroutine determines that the user did not make an error at a step, it proceeds to a confirmation subroutine, for which there are two possible options, in one embodiment of the logic. The first option occurs when the user did not make a mistake the previous time the step was executed (i.e., current error value does not match this step) and the step is automatically increased by one as the logic continues onto the "increase current step register by 1" step shown in the flow chart of FIG. 8. If the user made a mistake in the previous attempt at this particular step, the device provides positive reinforcement after the execution of the step. An output is provided from the injection training device or system to confirm that the step was completed correctly, and the logic continues onto the "Increase current step register by 1 function" step.

Figure 9:
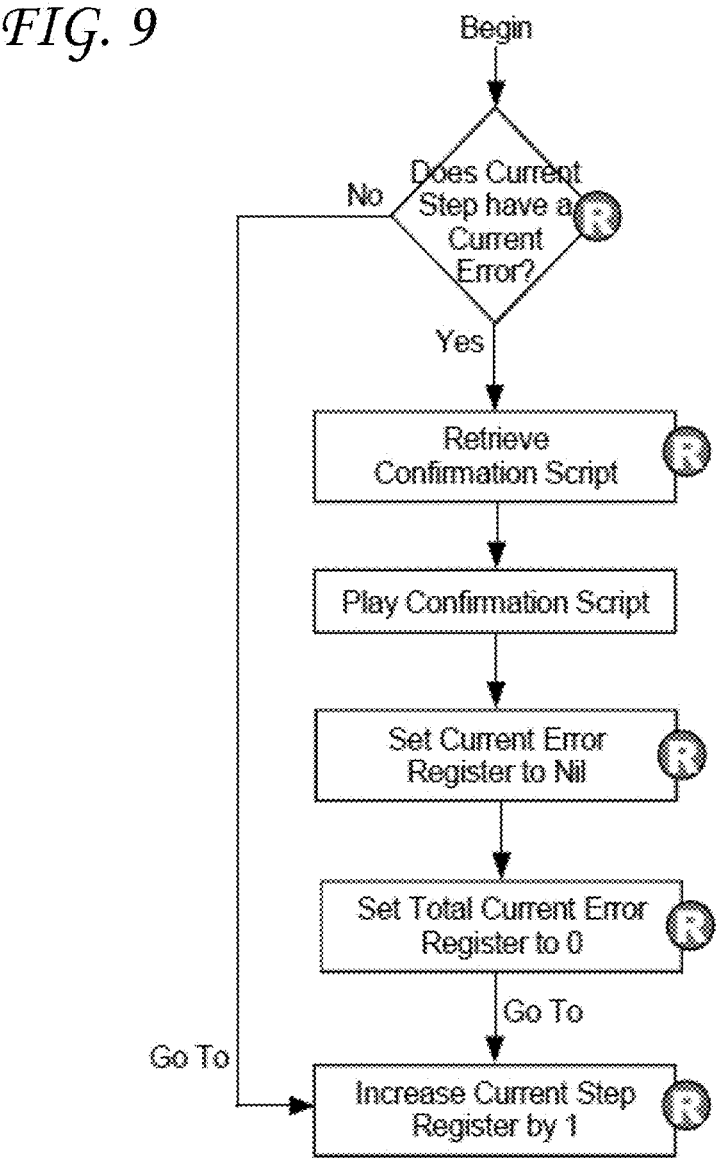
FIG. 9 is a flow chart demonstrating an embodiment of the operation logic as it relates to a step in which an error condition previously occurred.

FIG. 9 is a flow chart demonstrating an embodiment of the logic of circuitry of an injection training device as it relates to a step in which an error condition previously occurred showing the confirmation of correct usage of the device and/or system by the user. For example, if an error condition occurred in a previous step, once the user approaches that same step, the injection training device and/or system provides positive reinforcement to the user. Following correct execution of the step, an output to the user via the signal output component is provided to confirm to the user that the step was completed correctly (play confirmation script). Thereafter, the current error register is set to zero and the current step is increased by 1.

The flow charts provided in the figures herein provide examples of some of the functions of the circuitry of the injection training device and system. However, the circuitry can perform additional functions and has additional features associated therewith; therefore, the flow charts provided herein are not intended to be limiting of the function of the circuitry of the device and system. Additional features include, but are not limited to, the ability of a user to change the language of the audio of the device and system, the ability of a user to pause the instructions, replay the instructions or go back to a previous instruction as well as stop the instructions. A user can also power on and power off the device in the methods currently known to those of skill in the art.

The terminology used herein is for the purpose of describing particular embodiments only and is not intended to be limiting. As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided. It should be borne in mind that all patents, patent applications, patent publications, technical publications, scientific publications, and other references referenced herein are hereby incorporated by reference in this application in order to more fully describe the state of the art to which the present invention pertains.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. An injection training device configured to interact with an injection device having an injection member, said injection training device comprising:
   a housing comprising an opening;
   a pad component disposed in said opening, wherein said pad component is configured to receive an injection member of an injection device;
   a signal output component;
   circuitry associated with the housing to provide a communication about an operation of the injection device to a user of the injection training device through the signal output component, wherein the circuitry comprises a time-keeping component; and
   a force sensing component, wherein said force sensing component detects one or more forces from the injection device;
   wherein the one or more forces include at least a first force and a second force, wherein the first force is detected by the force sensing component once the injection device is activated, and the second force is detected by the force sensing component after a complete dose of a medicament contained within the injection device has been delivered;
   wherein the force sensing component of the injection training device is configured to detect the presence of the injection device on the pad component, wherein when the force sensing component detects the presence of the injection device on the pad component before the force sensing component detects the first force of the injection device, and the force sensing component detects no presence of the injection device on the pad component before the second force of the injection device is detected, the circuitry detects that an error condition has occurred and an error message is communicated through the signal output component;

wherein the communication about an operation of the injection device is provided through the signal output component based on the one or more forces and timing thereof.

2. The injection training device of claim 1, further comprising a user interface.

3. The injection training device of claim 1, further comprising at least one additional sensor, wherein the at least one additional sensor comprises at least one of a light sensor, a contact sensor, an orientation sensor, a capacitive sensor, an inductive sensor, a flow sensor, a pressure sensor, a strain gauge sensor, a tilt sensor, and a temperature sensor.

4. The injection training device of claim 1, wherein the communication provided by the injection training device comprises an instruction to the user for using the injection device, said instruction is based on information received by the injection training device.

5. The injection training device of claim 1, wherein the pad component comprises a skin layer, adipose layer, simulated ligament material, simulated tendon material, simulated bone material, simulated vasculature material, simulated organ material, and/or simulated bodily fluid, said layers, material and fluid being configured to mimic human or non-human animal skin and adipose tissue, ligaments, tendons, bones, vasculature, organs and/or fluid.

6. The injection training device of claim 1, wherein the training device is configured to provide stepwise instructions for administering an injection to a user.

7. The injection training device of claim 1, wherein the skin layer and/or the subcutaneous layer of the pad component mimics the puncture resistance of skin and/or subcutaneous tissue of a human or non-human animal.

8. The injection training device of claim 1, wherein the pad component comprises an absorbent material.

9. The injection training device of claim 1, wherein the pad component is removable.

10. The injection training device of claim 1 further comprising a microphone component, wherein said microphone component detects one or more sounds from the injection device.

11. The injection training device of claim 10, wherein the communication about an operation of the injection device is provided through the signal output component based on the one or more sounds and/or a sensor input received from the injection device.

12. The injection training device of claim 11, wherein the injection device is an auto injector and the one or more sounds include at least a first sound and a second sound, wherein a first sound is detected by the microphone component once the auto injector is activated and the injection member is extended, and the second sound is detected by the microphone component after a complete dose of a medicament contained within the auto injector has been delivered through the injection member.

13. An injection training device configured to interact with an injection device having an injection member, said injection training device comprising:

a housing comprising an opening;
a pad component disposed in said opening, wherein said pad component is configured to receive an injection member of an injection device;
a signal output component; and
circuitry associated with the housing to provide a communication about an operation of the injection device to a user of the infection training device through the signal output component;
a microphone component, wherein said microphone component detects one or more sounds from the injection device;
wherein the communication about an operation of the injection device is provided through the signal output component based on the one or more sounds and/or a sensor input received from the injection device
wherein the injection device is an auto injector and the one or more sounds include at least a first sound and a second sound, wherein a first sound is detected by the microphone component once the auto injector is activated and the injection member is extended, and the second sound is detected by the microphone component after a complete dose of a medicament contained within the auto injector has been delivered through the injection member;
wherein the injection training device comprises a sensor, said sensor being configured to detect the presence of the injection member in the pad component, wherein when the sensor detects the presence of the injection member in the pad component before the microphone component detects the first sound of the auto injector, and the sensor detects no presence of the injection member in the pad component before the second sound of the auto injector is detected, the circuitry detects that an error condition has occurred and an error message is communicated through the signal output component.

14. The injection training device of claim 1, wherein the circuitry further comprises a microcontroller.

15. The injection training device of claim 3, wherein the injection training device detects a condition of the injection device.

16. The injection training device of claim 15, wherein the condition of the injection device detected is compared to a predetermined condition for the injection device.

17. The injection training device of claim 16, wherein an output from the signal output component is initiated in response to a predetermined value detected for a condition.

18. The injection training device of claim 3, wherein the at least one additional sensor is an orientation sensor, provided to detect an orientation of the injection device relative to the injection training device.

19. The injection training device of claim 18, wherein an output from the signal output component is initiated if the detected orientation of the injection device meets a predetermined orientation value.

20. The injection training device of claim 3, wherein the at least one additional sensor is a contact sensor provided to detect a contact between the injection device and the injection training device.

21. The injection training device of claim 20, wherein an output from the signal output component is initiated if the detected contact of the injection device meets a predetermined contact value.

22. The injection training device of claim 3, wherein the at least one additional sensor is configured to detect the perpendicularity of the injection device relative to a surface of the pad component.

23. The injection training device of claim 22, wherein an output from the signal output component is initiated if the detected perpendicularity of the injection device meets a predetermined perpendicularity value.

24. The injection training device of claim 3, wherein the at least one additional sensor is provided to detect alignment of the injection device during operation of the injection training device.

25. The injection training device of claim 24, wherein an output from the signal output component is initiated if the detected alignment of the injection device meets a predetermined alignment value.

26. The injection training device of claim 1, wherein the injection device comprises and auto injector.

27. An injection training device configured to interact with an injection device, said injection training device comprising:
- a housing comprising an opening;
- a pad component disposed in said opening, wherein said pad component is configured to receive an injection device;
- a signal output component; and
- circuitry associated with the housing to provide a communication about an operation of the injection device to a user of the injection training device through the signal output component;
- a force sensing component, wherein said force sensing component detects one or more forces from the injection device;
- wherein the communication about an operation of the injection device is provided through the signal output component based on the one or more forces received from the injection device;
- wherein the injection device is an auto injector and the one or more forces include at least a first force and a second force, wherein a first force is detected by the force sensing component once the auto injector is activated, and the second force is detected by the force sensing component after a complete dose of a medicament contained within the auto injector has been delivered;
- wherein the force sensing component is configured to detect the presence of the auto injector on the pad component, wherein when the force sensing component detects the presence of the auto injector on the pad component before the force sensing component detects the first force of the auto injector, and the force sensing component detects no presence of the auto injector on the pad component before the second force of the auto injector is detected, the circuitry detects that an error condition has occurred and an error message is communicated through the signal output component.

* * * * *